(No Model.)
J. ROTHLISBERGER & H. GRAICHEN.
STOVE.
No. 575,041. Patented Jan. 12, 1897.
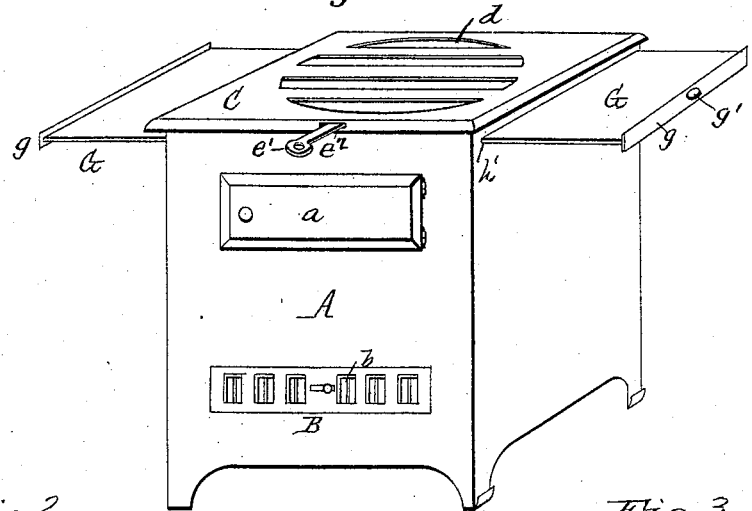
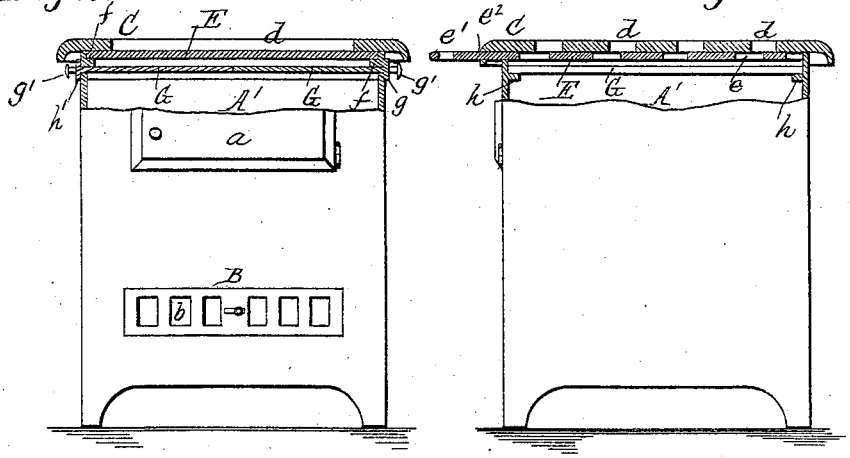
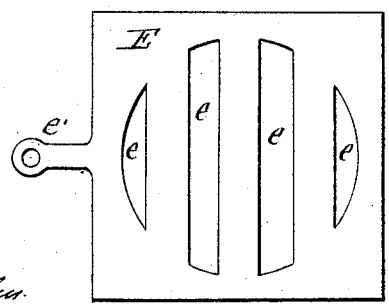
Witnesses:
F. Gustav Wilhelm
Chas. F. Burkhardt
James Rothlisberger
Herman Graichen
Inventors.
By Wilhelm & Bonner
Attorneys.

UNITED STATES PATENT OFFICE.

JAMES ROTHLISBERGER AND HERMANN GRAICHEN, OF NIAGARA FALLS, NEW YORK.

STOVE.

SPECIFICATION forming part of Letters Patent No. 575,041, dated January 12, 1897.

Application filed April 18, 1896. Serial No. 588,163. (No model.)

*To all whom it may concern:*

Be it known that we, JAMES ROTHLISBERGER and HERMANN GRAICHEN, citizens of the United States, residing at Niagara Falls, in the county of Niagara and State of New York, have invented a new and useful Improvement in Stoves, of which the following is a specification.

This invention relates more particularly to that class of stoves which are employed by bakers. For the purpose of regulating the heat such stoves have usually been provided in their top with a series of removable concentric rings, so that the opening in the top could be reduced in size by adding more rings or enlarged by removing one or more rings. This construction is not desirable, because the frying or lard kettle placed on the stove must be removed and again replaced in changing the rings, involving a loss of time and incurring the danger of injury from the boiling fat or lard in the kettle.

Our invention has for its object to provide the stove-top with simple and convenient means whereby the heat can be readily regulated without disturbing the kettle or other utensil placed thereon.

In the accompanying drawings, Figure 1 is a perspective view of a baker's stove embodying our invention. Figs. 2 and 3 are front and side views of the stove, respectively, with the upper portions shown in section. Fig. 4 is a detached plan view of the main damper.

Like letters of reference refer to like parts in the several figures.

A is the body of the stove, which forms no part of our invention and which may be of any suitable construction. The stove shown in the drawings contains the usual fireplace A', to which fuel is supplied through a door $a$ in the front of the stove, and the usual ash-pit, having a door B, provided with the customary damper $b$.

C is the flat top plate of the stove, upon which the lard-kettle or other utensil is placed and which forms the top of the fire-chamber. This top has no stove holes and lids, but is provided directly over the fireplace with a number of slots or apertures $d$ for the passage of the heat, these slots being preferably arranged within the area of a circle of about the same diameter as the usual lard-kettle.

E is a horizontal damper or slide applied to the under side of the slotted stove-top and adapted to cover the slots thereof, more or less, so as to regulate the passage of the heat through the same or to close the same entirely. This damper is provided with a series of slots or apertures $e$, which are adapted to register with the slots $d$ of the stove-top for allowing the heat to ascend through the top. The damper is supported on horizontal ways or ledges $f$, formed on the side walls of the stove, and it has a handle $e'$, which projects through a horizontal slot $e^2$, formed in the front wall of the stove. The apertures of the damper are preferably so arranged that when the damper is fully closed the apertures of the stove-top are entirely open. Upon drawing out the damper, more or less, the slots of the stove-top are covered to a corresponding extent by the solid portions of the damper, thus regulating the passage of heat accordingly, and by fully withdrawing the damper said slots are closed entirely, thus shutting off the direct heat from the kettle or other utensil on the stove. The heat can thus be conveniently regulated by simply sliding the damper E in or out and without the necessity of handling the kettle, thereby avoiding all danger of injuring the baker or attendant.

When the stove is highly heated, the kettle receives considerable heat by radiation even when the damper E is fully closed, and in order to permit radiation of the heat to be still further checked the stove is provided immediately below said damper with an auxiliary horizontal damper or dampers G, which are adapted to extend across the fireplace between the fuel and the main damper E. In the drawings two such auxiliary dampers are shown, one on each side of the stove, and the two dampers when closed or pushed inward meet in the middle of the fireplace, as shown in Fig. 2, thus interposing two thicknesses of metal between the fire and the bottom of the kettle or other utensil and sufficiently checking radiation to permit the kettle to remain on the stove without liability of boiling over.

These auxiliary dampers slide upon horizontal ways or ledges $h$, formed on the front and rear walls of the stove, as shown in Fig. 3, and their outer portions extend through horizontal slots $h'$, formed in the side walls of the stove. Each of these dampers is provided at its outer end with a rib or flange $g$ for covering the slot $h'$ and a knob $g'$ for manipulating it. Upon withdrawing the auxiliary dampers, as shown in Fig. 1, the heat is allowed to come in direct contact with the stove-top.

While the auxiliary dampers are preferably employed in conjunction with the slotted top and the main damper E, they may be omitted and the latter be used alone.

Our improvements, though especially desirable in connection with a baker's stove, are equally applicable to cooking-stoves.

We claim as our invention—

1. The combination with the stationary top plate of a stove having slots over the firechamber, of a damper arranged below said top plate and provided with slots adapted to register with the slots of the top plate and having a manipulating device which projects from said damper outwardly below said top plate, whereby said damper can be operated without disturbing the vessel resting on said top plate, substantially as set forth.

2. The combination with the stationary top plate of a stove having slots over the firechamber, of a damper arranged below said top plate and having slots adapted to register with those of the top plate, and an imperforate damper arranged below said slotted damper and adapted to exclude the heat from the same and from the overlying top plate, substantially as set forth.

3. The combination with the stationary top plate of a stove having transverse slots over the fire-chamber, of a longitudinally-movable damper arranged below said slotted top plate and having transverse slots adapted to register with the slots of the top plate, and two imperforate dampers arranged below said slotted damper and adapted to be moved transversely in opposite directions for exposing the slotted damper to the heat or excluding the heat therefrom, substantially as set forth.

Witness our hands this 7th day of April, 1896.

JAMES ROTHLISBERGER.
HERMANN GRAICHEN.

Witnesses:
CARL F. GEYER,
AGNES E. BURKE.